US009823750B2

(12) United States Patent
Russ et al.

(10) Patent No.: US 9,823,750 B2
(45) Date of Patent: Nov. 21, 2017

(54) CAPTURING GESTURE-BASED INPUTS

(71) Applicants: Ronald Paul Russ, Farmington Hills, MI (US); Matthew Mark Mikolajczak, Novi, MI (US); James Joseph Kornacki, Dearborn, MI (US)

(72) Inventors: Ronald Paul Russ, Farmington Hills, MI (US); Matthew Mark Mikolajczak, Novi, MI (US); James Joseph Kornacki, Dearborn, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 14/665,822

(22) Filed: Mar. 23, 2015

(65) Prior Publication Data

US 2016/0282946 A1    Sep. 29, 2016

(51) Int. Cl.
*G06F 3/01* (2006.01)

(52) U.S. Cl.
CPC .................................. *G06F 3/017* (2013.01)

(58) Field of Classification Search
CPC ...... G06F 3/017; G06F 3/0304; G06F 3/0308; G06F 3/042–3/0428

USPC .................... 345/156, 175; 178/18.09, 18.11
See application file for complete search history.

(56) References Cited

U.S. PATENT DOCUMENTS

| 7,638,754 B2* | 12/2009 | Morimoto ................. G01J 1/32 250/206 |
| 2002/0107674 A1* | 8/2002 | Bascle .................... G06F 3/011 703/1 |
| 2002/0113903 A1* | 8/2002 | Needham .............. G06F 3/0425 348/702 |
| 2005/0104860 A1* | 5/2005 | McCreary ............. G06F 3/0421 345/173 |
| 2009/0135162 A1* | 5/2009 | Van De Wijdeven .............. G06F 3/0421 345/175 |
| 2011/0050650 A1* | 3/2011 | McGibney ............ G06F 3/0386 345/175 |
| 2013/0314317 A1 | 11/2013 | Wu et al. |

\* cited by examiner

*Primary Examiner* — Stephen Sherman
(74) *Attorney, Agent, or Firm* — Dickinson Wright PLLC

(57) ABSTRACT

Systems, methods, and devices for capturing gesture-based inputs are disclosed herein. The concept employs infrared light emitting diodes (LEDs), infrared (IR) sensor, and processing of the information obtained by the interplay of the two. The processed information may be effectively translated to various gesture-based control systems, such as those employed to interact with electronic systems and displays.

12 Claims, 7 Drawing Sheets

CAPTURING GESTURE-BASED INPUTS

BACKGROUND

Interfaces are becoming more complex and dual in nature. Providing multiple ways to interact with a system is becoming more commonplace. Thus, a user of a system may selectively choose a first or second technique for engaging the system. In certain instances, the transition between a first and second technique may require a toggle switch. In other instances, both the first and second techniques may simultaneously be available to the user.

One such input technique is a gesture based input. The gesture based input allows a detection of movement from a cue, such as a body part (commonly the hand), and based on the detected movement or gesture, a command is initiated. The gesture based inputs do not require the user to make contact with a touch, surface, pad, or device.

The gesture is captured via a video camera or motion detector. Accordingly, the video camera captures the movement, correlates the movement to a stored command center (i.e. a processor and storage device), and translates the movement into an action.

The conventional gesture-based input systems employ image/video capturing techniques. The amount of processing consumed with the conventional gesture-based systems may place a strain on available processing power and storage capabilities. Because image or real-time video is stored and processed, a powerful processor and a digital storage amount may become necessary. Thus, conventional gesture-based input systems may be both wasteful in resources and costly to implement.

SUMMARY

The following description relates to a s capturing gesture-based inputs. Exemplary embodiments may also be directed to any of the system, the wireless charging device, a display, or combinations thereof.

Additional features of the invention will be set forth in the description which follows, and in part will be apparent from the description, or may be learned by practice of the invention.

A system for capturing gesture-based inputs is included herein. The system includes a light emitting diode (LED) cycler to communicate instructions to a gesture-based capturing device to pulse a plurality of LEDs and a plurality of infrared (IR) sensors; a light detector to receive a plurality of data sets from the gesture-based capturing device generated from the plurality of IR sensors; a signal detector to receive information based on the plurality of data sets; and a command communicator to communicate the received information to an output device.

A method for controlling a gesture-based input device is included herein. The method includes turning on a set of light emitting diodes (LEDs), the set being a grouping of LEDs greater than one; performing an infrared (IR) sensor detection based on the turned on set of the LEDs to create at least one of a plurality of data sets; determining whether there are more sets to iterate to, and in response to the determination being no, waiting a predetermined time period to elapse, and returning to the turning and setting the set of LEDs to be a first set; in response to the determination being yes, iterating a step count by one, the step count being an index of the set of LEDs; and returning to the turning.

A gesture-based input device for interfacing with an electronic system is included herein. The device includes a plurality of light emitting diodes (LEDs); and a plurality of infrared (IR) sensors. Further, the plurality of LEDs are turned on/off in a predetermined pattern, and the plurality of IR sensors collect information, the collected information being employed to provide gesture-based control of the electronic system.

It is to be understood that both the foregoing general description and the following detailed description are exemplary and explanatory and are intended to provide further explanation of the invention as claimed. Other features and aspects will be apparent from the following detailed description, the drawings, and the claims.

DESCRIPTION OF THE DRAWINGS

The detailed description refers to the following drawings, in which like numerals refer to like items, and in which.

DETAILED DESCRIPTION

Figure 1:
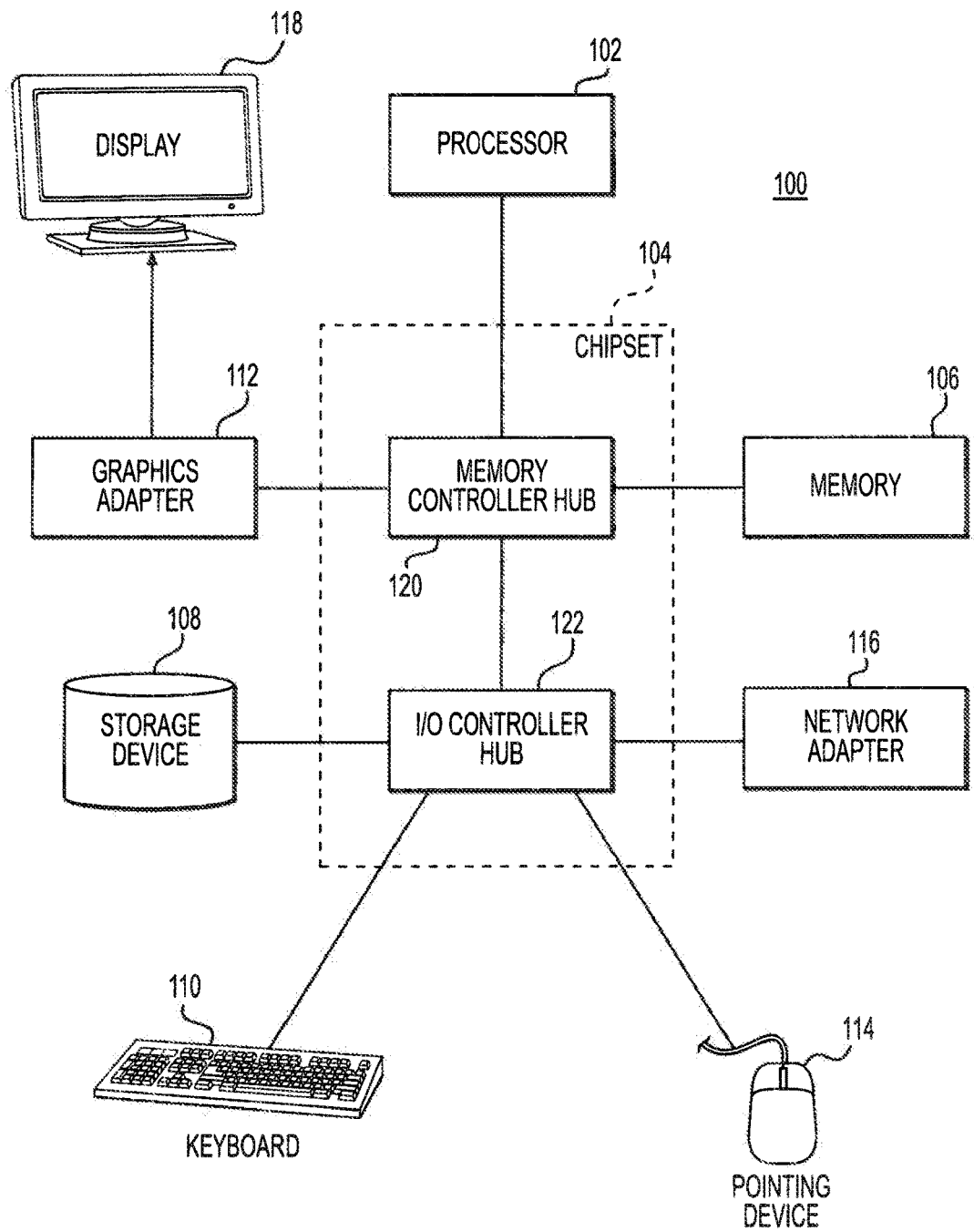
FIG. 1 is a block diagram illustrating an example computer.

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

Gesture-based input systems and devices may be employed for various input related activities. An appendage, for example, a hand may be contorted or moved, with the contortion or movement correlated to a specific action or command. The action or command may be translated via a processor or computing device, and corresponded to a stimulation of an action.

For example, the movement of a hand from one location to another location may be employed to simulate a pointer on a digital display. Further, a change of shape of the hand may represent a command or other action. In the case of the pointer, for example, the closing of the hand may correspond to an execution of an icon associated with the pointers current location. As gesture-based control devices are known, a detailed description will be omitted.

However, as explained in the Background section, conventional gesture-based input/control devices or systems employ image or video capturing devices. The implementation of these devices may be costly and/or resource intensive (i.e. consuming a significant portion of a processor's availability). Thus, the implementation may be frustrated for at least the above-enumerated reasons.

Disclosed herein is a gesture-based input system, method or device based on light emitting diodes (LED) and a light sensor. Employing the concepts disclosed herein, the implementation of a gesture-based input system may be simplified, reduced in cost, and still effectively provide accurate gesture detection.

The aspects disclosed herein may be employed in any location or context where an input interface is employed or utilized. The interface provided herein may be provided as a stand-alone device, integrated into existing electronic systems, or provided in a newly designed electronic system.

FIG. 1 is a block diagram illustrating an example computer 100. The computer 100 includes at least one processor 102 coupled to a chipset 104. The chipset 104 includes a memory controller hub 120 and an input/output (I/O) controller hub 122. A memory 106 and a graphics adapter 112 are coupled to the memory controller hub 120, and a display 118 is coupled to the graphics adapter 112. A storage device 108, keyboard 110, pointing device 114, and network adapter 116 are coupled to the I/O controller hub 122. Other embodiments of the computer 100 may have different architectures.

The storage device 108 is a non-transitory computer-readable storage medium such as a hard drive, compact disk read-only memory (CD-ROM), DVD, or a solid-state memory device. The memory 106 holds instructions and data used by the processor 102. The pointing device 114 is a mouse, track ball, or other type of pointing device, and is used in combination with the keyboard 110 to input data into the computer 100. The pointing device 114 may also be a gaming system controller, or any type of device used to control the gaming system. For example, the pointing device 114 may be connected to a video or image capturing device that employs biometric scanning to detect a specific user. The specific user may employ motion or gestures to command the point device 114 to control various aspects of the computer 100.

The graphics adapter 112 displays images and other information on the display 118. The network adapter 116 couples the computer system 100 to one or more computer networks.

The computer 100 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 108, loaded into the memory 106, and executed by the processor 102.

The types of computers used by the entities and processes disclosed herein can vary depending upon the embodiment and the processing power required by the entity. The computer 100 may be a mobile device, tablet, smartphone or any sort of computing element with the above-listed elements. For example, a data storage device, such as a hard disk, solid state memory or storage device, might be stored in a distributed database system comprising multiple blade servers working together to provide the functionality described herein. The computers can lack some of the components described above, such as keyboards 110, graphics adapters 112, and displays 118.

The computer 100 may act as a server (not shown) for the content sharing service disclosed herein. The computer 100 may be clustered with other computer 100 devices to create the server. The various computer 100 devices that constitute the server may communicate with each other over a network.

Figure 2:
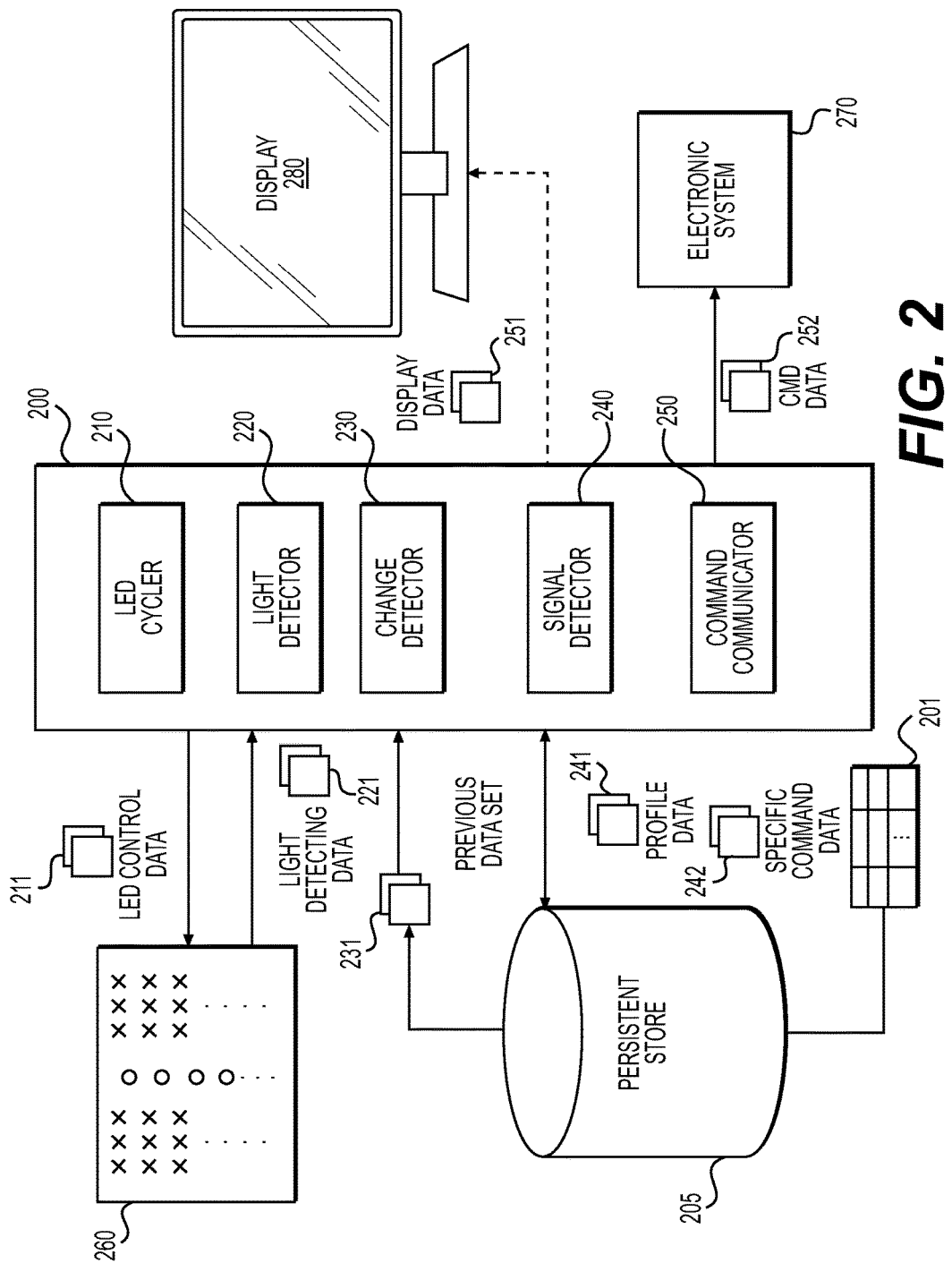
FIG. 2 illustrates an example of a system for capturing gesture-based inputs according to the aspects disclosed herein.

FIG. 2 illustrates a system 200 for capturing gesture-based inputs. The system 200 may be implemented on a device, such as computer 100 described above. The system 200 includes a light emitting diode (LED) cycler 210, a light detector interface 220, a change detector 230, a signal detector 240, and a command communicator 250.

The system 200 is wired, or wirelessly coupled to the other elements shown in FIG. 2, such as the gesture-based interface device 260 (which is shown in greater detail in FIG. 3), the persistent store 205, and output devices. The output device may include one, or both of the display 280 or the electronic system 270. The persistent store 205 may be any of the storage devices enumerated above with regards to storage device 108.

Figure 3A:
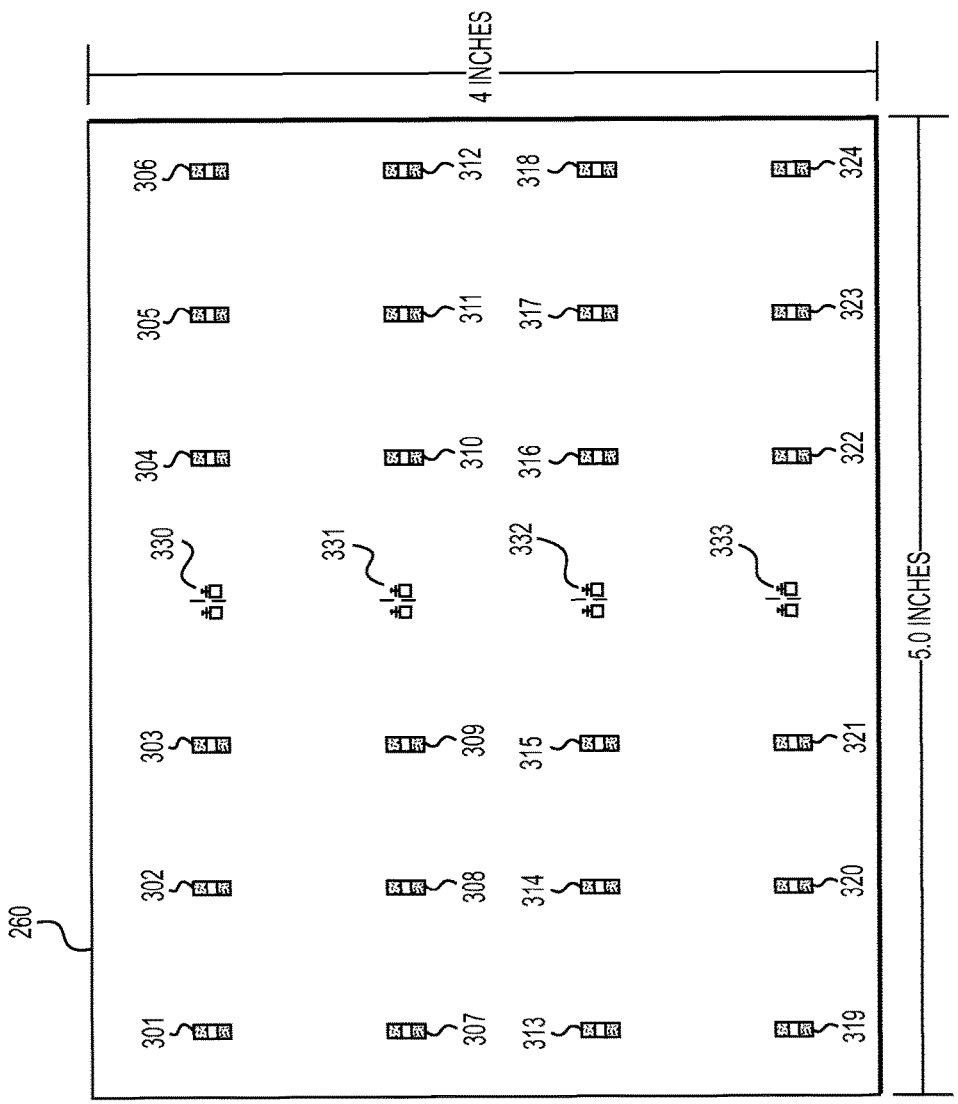
FIGS. 3(a) and (b) illustrate an example implementation of a gesture-based input device according to the aspects disclosed herein.
Figure 3B:
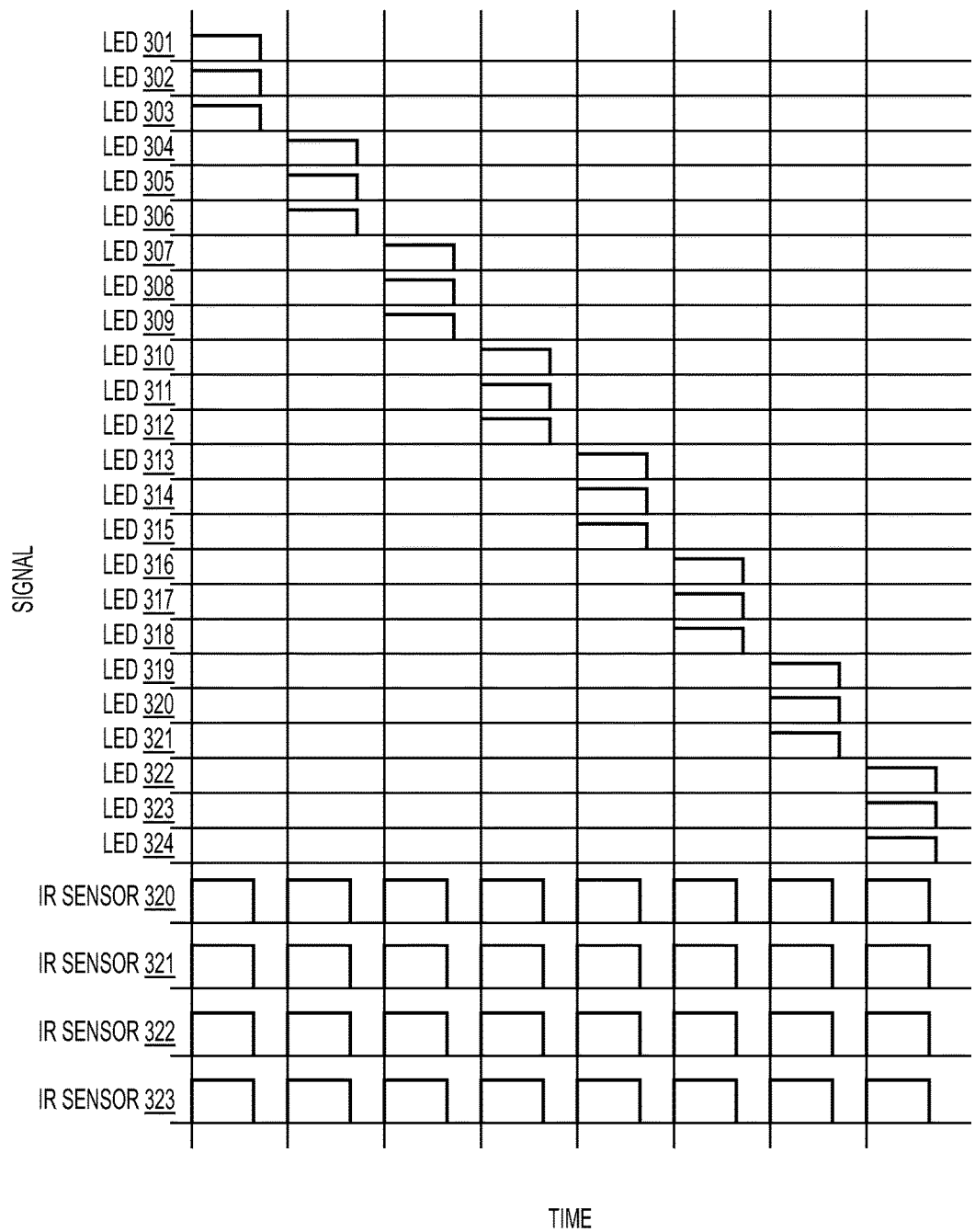

The LED cycler 210 communicates the LED control data 211 to the gesture-based interface device 260. The LED control data 211 includes information about which of the LEDs contained on the gesture-based interface device 260 is to be turned on. For example, the gesture-based interface device 260 may include a pattern of LEDs (as shown in FIG. 3). The LED control data 211 may instigate a set of the LEDs to turn on for a predetermined time period. As explained in the methods described in this disclosure, the number of LEDs on the gesture-based interface device 260 may be cycled in a pattern so that a specific number of sets including different or same numbers of individual LEDs are turned on.

The LED control data 211 may also instigate the turning on of the set of infrared (IR) light sensors contained on the gesture-based interface device 260. In response the IR light sensors turning on, a light detecting data 221 is also generated. Although only one light detecting data 221 is shown, there may be an individual data set for each cycle of LEDs asserted on. A cycle is defined as a grouping or plurality of LEDs (i.e. a set) being turned on simultaneously. Thus, as explained further below, the when a set of LEDs is asserted, or turned on, the IR sensors may also be turned on and employed to detect a light detection from the reflection off an object (i.e. an appendage or hand).

The light detector 220 receives the light detecting data 221 from the gesture-based interface device 260. As explained above, a data 221 may be received respectively for each assertion of the LED cycler 210. For example, if the gesture-based interface device 260 contains 24 LEDs, a set may include 3 LEDs. Thus, the LED cycler 210 may cycle through all the LEDs with 8 different cycles. In this way, there would be 8 different data sets of light detecting data 221. The different data sets may be superimposed with each other to create a whole data of the relative light over the gesture-based input device 260.

In this way, placing an object over the gesture-based input device 260, such as a hand or an appendage, may create a different reading of the light detection data 221 based on the location of the object and the relative distance of the object from the gesture-based input device 260. This is due to the LEDs on the gesture-based input device 260 reflecting off the object, and subsequently, the reflection being sensed by the various sensors.

The change detector 230 retrieves a previous data set 231 from the persistent store 205, and determines whether the light detecting data 221 (the combined data) is different. The previous data set 231 may be light detecting data 221 from a previous operation of the LED cycler 210 and light detector 220.

In response to no difference, the system 200 ceases further operation. However, if the difference is over a predetermined threshold, the signal detector 240 retrieves profile data 241 from the persistent store 205. The profile data 241 corresponds to a predefined object and location of the object based on the light detecting data 221. For example, if a hand or appendage is placed over the gesture-based input device 260, the profile data 241 may retrieve data associated with the hand or appendage at a specific location.

In another example, the profile data 241 may be cross-referenced to a lookup table 206 (stored in the persistent store 205), and employed to retrieve specific command data 242. The specific command data 242 may correspond to an action to control an electronic system 270. The specific command data 242 may correspond to specific actions associated with gesture-based control systems, such as rotation, switching, pointing, and the like. Thus, the system 200 may be cognizant of both a location of the object and the correlated gesture of the object (i.e. pointing, turning, switching, swiping, and the like).

The command communicator 250 communicates the retrieved data from the signal detector 240 to an output device. As shown in FIG. 2, the output device may be an electronic system 270 or a display 280.

For example, the command data 252 (processed via the command data 241), may be employed to serve as a command to operate and interact with an electronic system 270. In the scenario that the electronic system 270 is a radio or entertainment system, the turning motion (captured by system 200) may simulate the interaction of a knob associated with the radio or the entertainment system.

In another example, the output device may be a display 280. The display 280 may be any electronic display associated with the electronic system 270, or individually provided. Employing the display data 251 (sourced from the profile data 241), the display 280 may render an electronic rendition of the object captured by the gesture-based input device 260.

Employing the aspects disclosed above, a location and gesture associated with the object may be ascertained via the recorded light data received.

FIGS. 3(*a*) and (*b*) illustrate an example implementation of a gesture-based input device 260. The gesture-based input device 260 includes 24 LEDs (labeled 301-324), and four IR light sensors (330-333). The number of implemented LEDs and IR light sensors is purely exemplary. The LEDs shown are infrared LEDs, which aid with the usage of the IR light sensors.

As explained above, the sets of LEDs may be chosen by an implementer of the system 200. For example, in the situation shown in FIG. 3(*b*), the LEDs 301-324 are divided into 8 equal sets. The 8 equal sets are cycled through individually, with each of the IR sensors being asserted to capture a reading associated with the 8 equal sets.

The time that the LEDs are asserted and turned on may be set by an implementer of system 200. Further, as explained above, various permutations and combinations may be employed by an implementer of the system 200 or the device 260.

Figure 4:
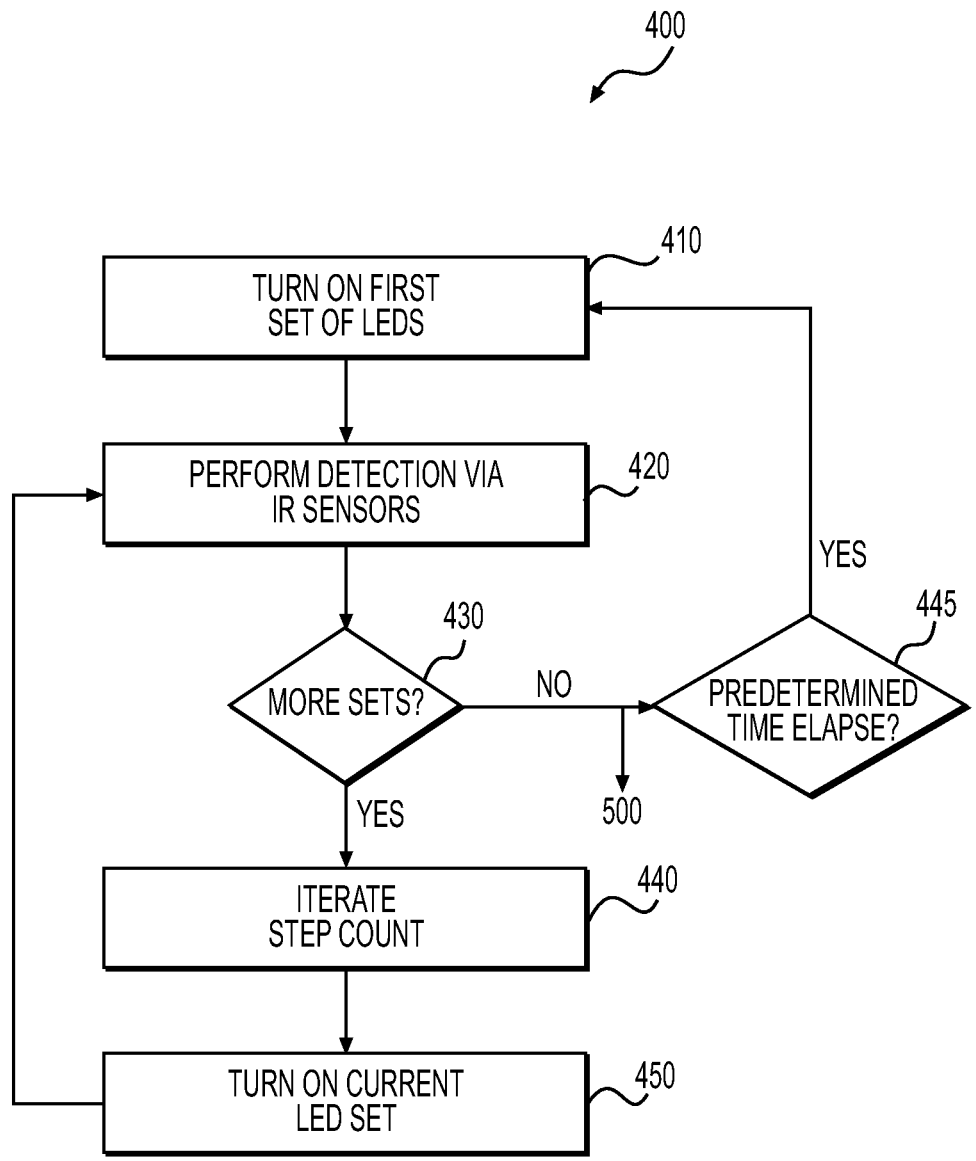
FIG. 4 illustrates an example of a method 400 for controlling a gesture-based input system according to the aspects disclosed herein.

FIG. 4 illustrates a method 400 for controlling a gesture-based input system. The method 400 may be implemented on a computer, such as the one described above with regards to FIG. 1.

In operation 410, a first set of LEDs are turned on. As explained in FIG. 3(*b*), the set may be predetermined by the implementer of method 400. The method 400 may proceed to operation 420.

In operation 420, detection via the provided IR sensors may be performed. The IR sensors sense light reflecting off a foreign object over the gesture-based input system from the provided LEDs (i.e. the set of LEDs turned on).

In operation 430, a determination is made as to whether there are more sets to be cycled through. If yes, the method 400 proceeds to operation 440. If No, the method 400 proceeds to operation 445. In operation 445, a predetermined time elapsing is determined to occur, and in response to that occurring, the method 400 proceeds back to operation 410 (where the method 400 is performed iteratively).

In parallel, the method 400 may also proceed to method 500. In method 500, the detected data (from operation 420), is processed and either converted to a digital display or employed as an input for an electronic system.

In operation 440, the step count is iterated. In operation 450, the current set (based on the iteration) of LEDs is turned on. The method 400 may proceed back to operation 420.

Figure 5:
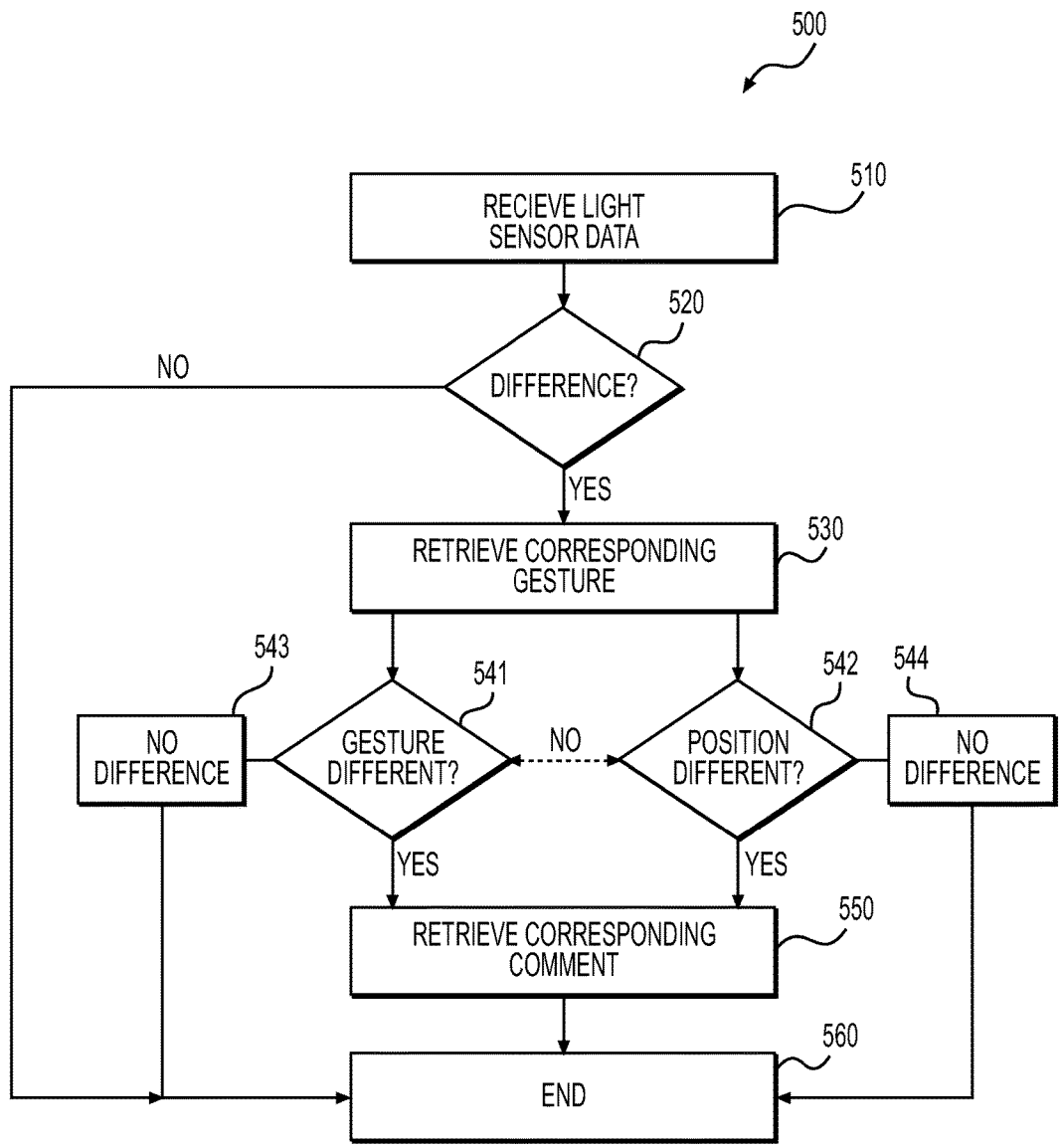
FIG. 5 illustrates an example of a method for processing light sensor data according to the aspects disclosed herein.

FIG. 5 illustrates a method 500 for processing light sensor data. The light sensor data may be sourced from system 200, or method 400 (and specifically after operation 430).

In operation 510, the light sensor data is received. The light sensor data may be defined by iterative and multiple readings based on a cycling of available LEDs.

In operation 520, a difference between the presently received light sensor data, and a previous recordation is compared. If there is no difference, the method proceeds to end 560. If there is a difference, the method 500 proceeds to operation 530.

In operation 530, the corresponding gesture or position of the object associated with the light sensor data is retrieved. Operation 530 may branch out into four different operations: 1) determination of a different gesture 541; 2) determination of a different position 542; both (541 and 542); or none (543 and 544). If nothing is performed, the method 500 proceeds to end 560.

In operation 550, the corresponding command associated with either the retrieved gesture or position is retrieved. Although not shown, an image of graphical user interface (GUI) may be transmitted to an electronic display capable of receiving such images or image data.

The retrieved command may be transmitted to an electronic system, and employed as an interface or input command.

Figure 6A:
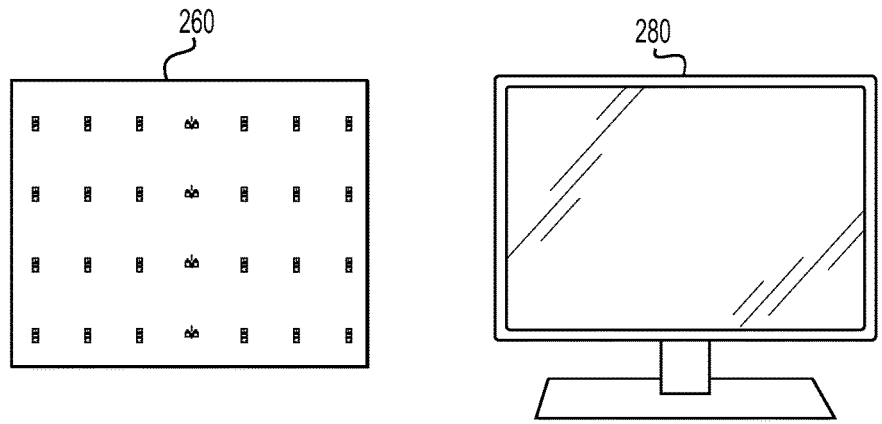
FIGS. 6(a)-(c) illustrate examples of an implementation of system shown in FIG. 2 according to the aspects disclosed herein.

FIGS. 6(*a*)-(*c*) illustrate examples of an implementation of system 200, according to the aspects disclosed herein. Although system 200 is not shown, system 200 is coupled to all the elements shown in FIGS. 6(*a*)-(*c*).

As shown in FIG. 6(*a*), a display 280 is provided, and a gesture-based input device 260 is also provided. On the display 280, there is an engage-able GUI 610. In the state shown in FIG. 6(*a*), there is no object or appendage over the gesture-based input device 260.

Figure 6B:
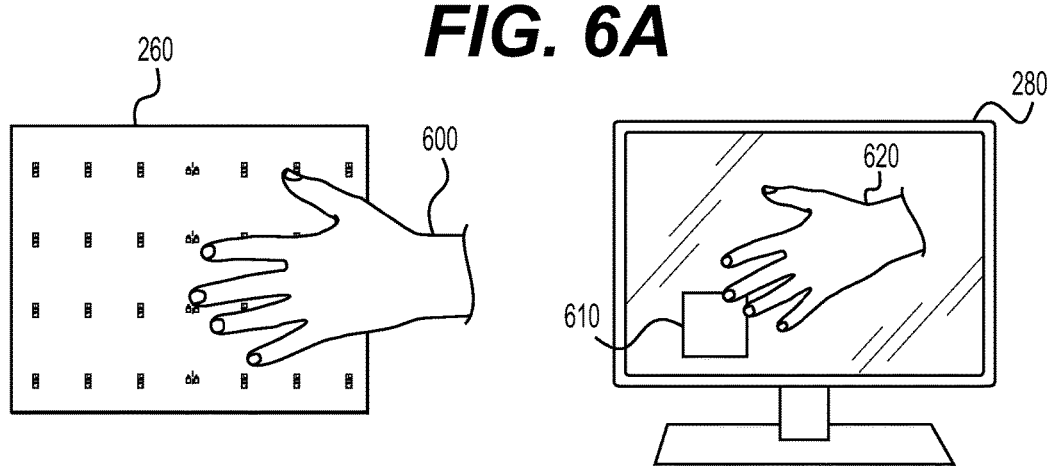

In FIG. 6(b), a hand 600 is placed over the gesture-based input device 280. The hand 600 is open. Correspondingly, employing the aspects disclosed herein, a digital hand 620 is shown in display 280.

Figure 6C:
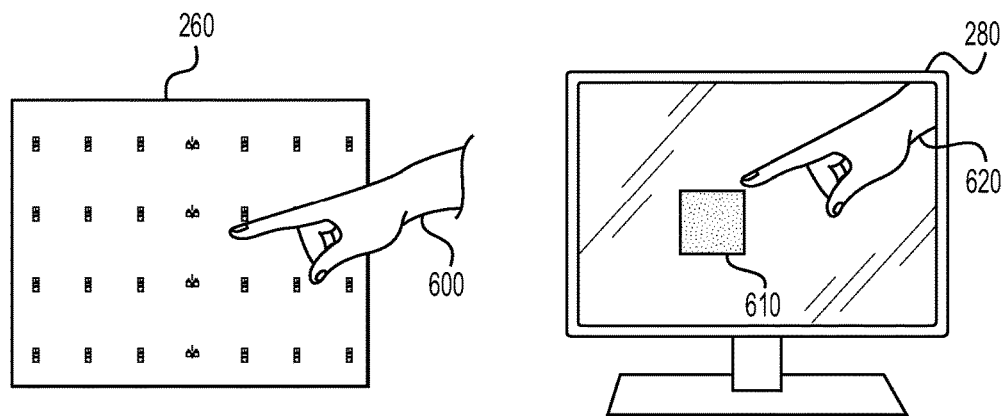

In FIG. 6(c), the hand 600 now makes a pointing gesture, and is moved to cause the digital hand 620 to move so that it overlaps the GUI 610. The GUI 610 is engaged (i.e. shown as shaded), with the digital hand 620 also shown to be in a pointing orientation.

The aspects disclosed herein presumably employ LEDs, IR sensors, and an algorithm to control the LEDs and IR sensors to receive data that may be translated to a gesture detection. Thus, employing the aspects disclosed herein, image and video capturing devices may be effectively omitted from a gesture-based detection device. This may lead to a more robust and cost-effective implementation.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

We claim:

1. A system for capturing gesture-based inputs, comprising:
   a light emitting diode (LED) cycler to communicate instructions to a gesture-based capturing device to pulse a plurality of LEDs and a plurality of infrared (IR) sensors;
   a light detector to receive a plurality of data sets from the gesture-based capturing device generated from the plurality of IR sensors;
   a signal detector to receive information based on the plurality of data sets; and
   a command communicator to communicate the received information to an output device,
   wherein the system is configured determine a three-dimensional shape of an appendage of the user from combining each reading from a pulse of the plurality of infrared (IR) sensors for at least one cycle of pulses of the plurality of LEDs.

2. The system according to claim 1, further comprising a change detector to determine whether a difference exists between a previous data set and the plurality of data sets.

3. The system according to claim 1, wherein the information is profile data, the profile data being a digital representation of an object over the gesture-based capturing device.

4. The system according to claim 3, wherein the profile data is rendered onto a digital display.

5. The system according to claim 1, wherein the information is specific command data associated with an orientation of an object over the gesture-based capturing device.

6. The system according to claim 5, wherein the specific command data is employed to interface with an electronic system.

7. The system according to claim 1, wherein the plurality of LEDs are divided by a predetermined set pattern, and the LED cycler is configured to cycle through the plurality of LEDs by turning on the plurality of LEDs based on the predetermined set pattern.

8. The system according to claim 7, wherein the LED cycler is configured to re-cycle the plurality of LEDs in response to a predetermined time period elapsing.

9. The system according to claim 1, wherein the predetermined pattern is configurable by an implementer of the gesture-based input device.

10. The system according to claim 1, wherein the plurality of IR sensors are placed in between the plurality of LEDs.

11. The system according to claim 10, wherein the plurality of LEDs include a first portion and a second portion, wherein each of the first portion and the second portion are defined by at least more than one row and more than one column, wherein each column and row includes at least more than one of the plurality of LEDs.

12. The system according to claim 11, wherein the plurality of IR sensors are only placed between the first portion and the second portion.

* * * * *